No. 807,646. PATENTED DEC. 19, 1905.
G. WEGELIN.
APPARATUS FOR MAKING LAMPBLACK.
APPLICATION FILED AUG. 19, 1903.
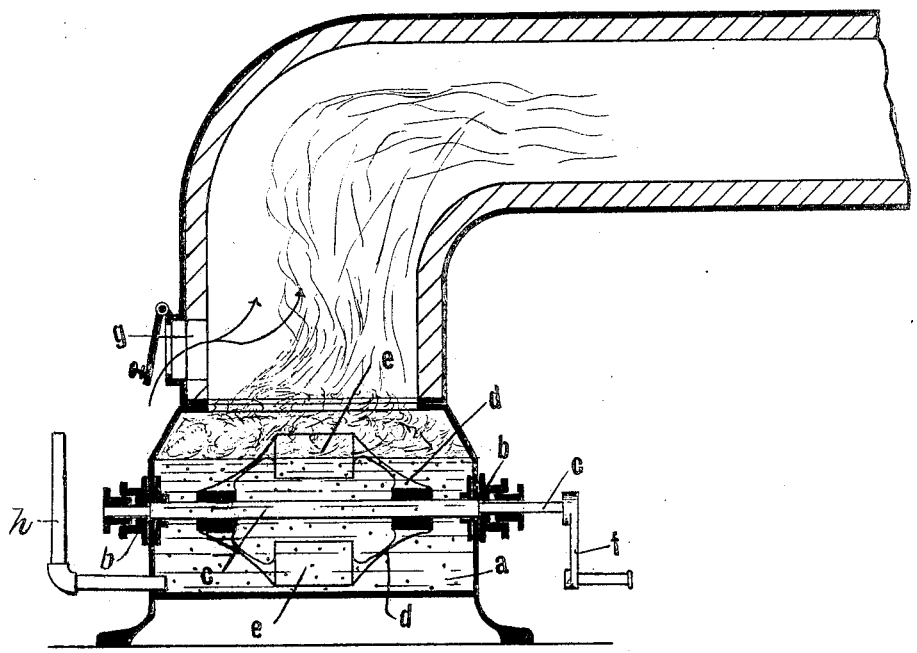

UNITED STATES PATENT OFFICE.

GOTTFRIED WEGELIN, OF KALSCHEUREN, GERMANY.

APPARATUS FOR MAKING LAMPBLACK.

No. 807,646.        Specification of Letters Patent.        Patented Dec. 19, 1905.

Application filed August 19, 1903. Serial No. 170,025.

*To all whom it may concern:*

Be it known that I, GOTTFRIED WEGELIN, engineer, a subject of the King of Prussia, German Emperor, residing at Kalscheuren, in the Kingdom of Prussia and German Empire, have invented certain new and useful Improvements in Apparatus for Making Lampblack, of which the following is a full, clear, and exact description.

The present invention relates to an apparatus for the manufacture of lampblack, and is an improvement of the apparatus described in my United States Patent No. 688,215, dated December 3, 1901. In the apparatus described in the said patent the pipe for conducting the hydrocarbon liquid to the vessel is likely to become unevenly heated on the several places within the combustion-chamber, and the result is that the distillation becomes too intensive on the places subjected to the strongest heat, on which places coke formation takes place and the pipe becomes choked.

The apparatus according to the present invention differs from that of my prior patent above referred to in that the pipes for heating the tar and the air for combustion are done away with. The air for the combustion is introduced above the upper level of the liquid and means are provided for stirring the liquid without moving the reservoir in which it is contained. The stirring of the hydrocarbon liquid is necessary in order to continuously force the lower strata of the liquid to the surface, thus preventing that the radiant heat of the flame from the gases, which get mixed with air and burn to soot above the liquid, acts only on the upper strata of the liquid and cause coke formation to take place. In the apparatus forming the subject-matter of my prior patent I effect the stirring of the liquid by forcing compressed air for combustion through the mass; but I have found that it is more simple to use a mechanical stirrer arranged within the vessel, and by means of such a stirrer I cause the liquid to continuously move within the vessel without necessitating movement of the vessel proper, which would require a more complicated construction and a greater motive power.

In the accompanying drawing I have shown a vertical section through my improved apparatus.

In the side walls of the vessel $a$ is journaled a shaft $c$, the journals being made tight by means of stuffing-boxes $b$. The shaft is provided with arms $d$, carrying stirrer-blades $e$.

The shaft $c$ is rotated by any suitable means, such as a crank $f$ or a small electromotor, and the movement of the stirrer-blades causes the lower strata of the liquid to be continuously forced to the surface, where they are heated by the radiant heat of the distillation-gases, which are mixed with the air passing in at $g$. Thus it is possible to avoid a special heating plant for the vessel or a compression-drum for the air or complicated devices for imparting movement to the vessel proper.

The tar is introduced into the vessel through the medium of any suitable means, such as a pipe $h$, leading from a tank (not shown) located at a higher level than the vessel.

Having described my invention, what I claim as new is—

In an apparatus for making lampblack, the combination of a stationary hydrocarbon-liquid-containing vessel open at the top and closed at the sides and at the bottom, a combustion-chamber communicating with the top of said vessel and provided with an air-inlet, and a mechanical stirrer within the vessel; said stirrer being journaled in the side walls of the vessel, and having a part projecting outside of the vessel.

In witness whereof I subscribe my signature in presence of two witnesses.

GOTTFRIED WEGELIN.

Witnesses:
     W. FRHRR. V. LYNCKER,
     CARL FR. SCHMITT.